United States Patent
Kaufmann

[11] 4,043,638
[45] Aug. 23, 1977

[54] LIQUID CRYSTAL DISPLAY MOUNTED BEHIND A FRONT GLASS

[75] Inventor: Meinolph Kaufmann, Fislisbach, Switzerland

[73] Assignee: BBC Brown Boveri & Company Limited, Baden, Switzerland

[21] Appl. No.: 692,752

[22] Filed: June 4, 1976

[30] Foreign Application Priority Data
Aug. 14, 1975 Switzerland .............. 10569/75

[51] Int. Cl.² .................. G02F 1/13
[52] U.S. Cl. .............. 350/160 LC; 58/50 R; 58/127 R; 350/179
[58] Field of Search .......... 350/160 LC, 179; 58/1 R, 45, 50 R, 127 R, 144

[56] References Cited
U.S. PATENT DOCUMENTS

| 3,295,913 | 1/1967 | Walther | 350/179 X |
| 3,465,516 | 9/1969 | von Meyer | 58/144 |
| 3,736,047 | 5/1973 | Gelber et al. | 350/160 LC |
| 3,877,790 | 4/1975 | Robinson | 350/160 LC |
| 3,991,554 | 11/1976 | Somogyi | 58/23 BA |

FOREIGN PATENT DOCUMENTS 1,472,294  2/1969  Germany .............. 350/179

*Primary Examiner* — Edward S. Bauer
*Attorney, Agent, or Firm* — Oblon, Fisher, Spivak, McClelland & Maier

[57] ABSTRACT

An improved liquid crystal display structure mounted behind a transparent cover plate is disclosed. The structure includes an immersion medium filling gaps which exist between the transparent cover plate and the liquid crystal display to reduce undesirable refractions and reflections of light impinging upon the liquid crystal display to improve the legibility of the display. The immersion medium may be transparent silicone oil, a curing silicone rubber, or pre-fabricated lenticular elements of silicone rubber.

6 Claims, 2 Drawing Figures

LIQUID CRYSTAL DISPLAY MOUNTED BEHIND A FRONT GLASS

BACKGROUND OF THE INVENTION

1. Field of the Invention

The present invention relates generally to liquid crystal display devices, and more particularly to a liquid crystal display device mounted behind a glass cover plate.

2. Description of the Prior Art

In a liquid crystal cell which serves as an indicator element, the liquid crystal layer is located between two transparent cell plates provided with specific electrode structures. A polarization foil is arranged on both sides of the liquid crystal cell. The rear side of the liquid crystal indicator is provided with a reflector.

In appliances with liquid crystal indicator, e.g. measuring instruments, computers, clocks or watches, the liquid crystal display element is conventionally placed in a housing which consists, on the front side, of a cover glass or transparent plastic panel or a glass sheet or sapphire glass. Behind this the liquid crystal display is placed at a distance of some tenths of a millimeter. Even where the liquid crystal display is intended to be in contact with the front glass, a very thin air gap is present between the liquid crystal indicator and the front glass.

The use of a front glass in an instrument with a liquid crystal display has the disadvantage, even where the glass possesses good transparency, that reflections and refractions occur at the two surfaces of the front glass and at the surface of the display element, which under unfavorable conditions of illumination, e.g. with weak illumination or with light falling at right angles onto the front glass and dark surroundings, render the reading of the indicated information difficult and reduce the contrast of the indication. With anti-reflection coatings, such as are used for improving optical instruments, it would be possible to eliminate the reflections from the front and rear sides of the cover plate and the surface of the liquid crystal display. This, however, is an expensive and questionable process, especially on the surface of the polarization foil. To make the housing terminate with the liquid crystal display on the front side has the disadvantage that the surface of the liquid crystal display, which is sensitive to scratching, shock and moisture, or the surface of the polarization foil stuck onto the latter, is unprotected.

SUMMARY OF THE INVENTION

It is accordingly one object of this invention to avoid the disadvantages of the prior art and to produce an arrangement which permits problemfree reading of instruments with liquid crystal displays even under unfavorable conditions of illumination.

This and other objects are achieved according to the invention in the case of liquid crystal displays of the type described above in that the space between the front glass and the liquid crystal display is filled with an immersion medium.

The immersion principle, known from microscopy (cf. "ABC of Optics," Dausien Press, Hanau, 1972, Page 565) underlies the invention.

For distances less than 0.4 mm between the front glass and the liquid crystal display, a transparent colorless silicone oil is particularly suitable as an immersion medium. Due to the small space, a capillary action occurs which prevents the escape of the silicone oil. For distances greater than 0.4 mm between the front glass and the liquid crystal display, the capillary action is not so intense as to preclude the escape of the silicone oil, consequently it is convenient to use as an immersion medium for correspondingly large distances a transparent silicone rubber which can be subsequently cured. A further advantage is presented by silicone rubbers which remain in a gel-like consistency after curing, since these can easily be removed and re-used, e.g. in the case of repairs to the instrument. In order to permit a complete and uniform displacement of the air spaces during assembly, lenticular elements of gel-like silicone rubber are preferably used.

It is also advantageous to eliminate reflections from the outward facing surface of the cover glass by applying an anti-reflection coating, so that disturbing reflections are also avoided there.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
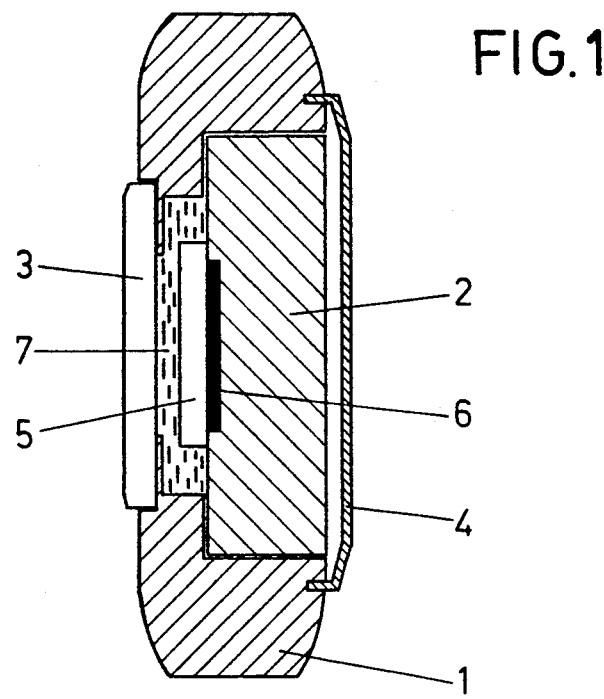
FIG. 1 is a sectional view taken through a watch with a liquid crystal display and an immersion medium, and, FIG. 2 is a sectional view taken through the front side of a watch with a liquid crystal display and showing the respective ray paths of incident light with and without the immersion medium.

Referring now to the drawings, wherein like reference numerals designate identical or corresponding parts throughout the several views, and more particularly to FIG. 1 thereof, an exemplary embodiment of the invention is shown as including an electronic circuit 2 located in a watch casing 1. The front side of the watch casing 1 is provided with a front glass or watch crystal 3, and the rear side with a cover 4. On the side of the electronic circuit 2 confronting the front glass 3 there is a liquid crystal display 5 with a reflector 6. The front glass 3 and the liquid crystal display 5 are not in mutual contact. The space between them is filled with an immersion medium 7.

Suitable substances for use as an immersion medium are those in which modifications of the optical characteristics, more particularly with regard to the transparency and refractive index, do not occur either due to the expected temperature fluctuations or to the intensity of the incident light. Silicone oil and silicone rubber particularly fulfil these requirements.

Figure 2:
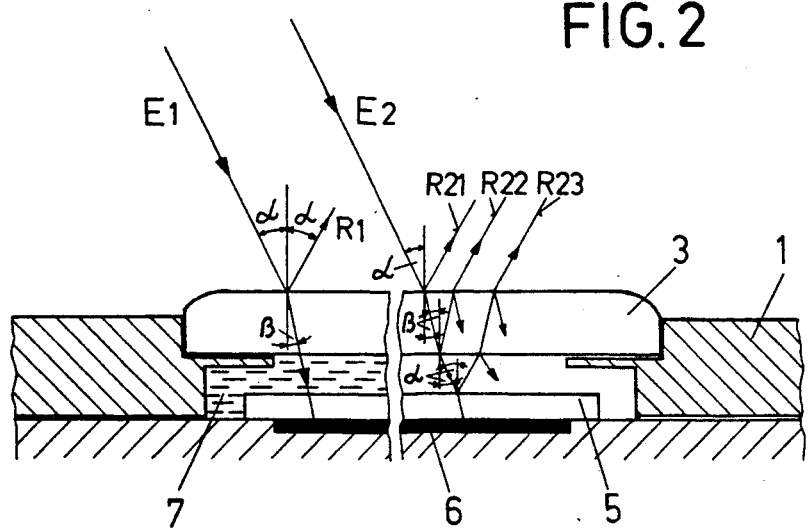

In FIG. 2 at the right side air is present in the space between the liquid crystal display 5 and the front glass 3 and E2 designates a light ray which strikes the surface of the front glass 3 at an angle $\alpha$ with respect to the perpendicular. The ray is partly reflected (ray R21). However, the incident ray E2 is for the greater part refracted, namely in accordance with the law of refraction: $(\sin\alpha/\sin\beta) = n$, where $\beta$ is the angle between the refracted ray and the perpendicular and n is the refractive index. The refracted ray is again partly reflected (ray R22) at the underside of the front glass 3, and it finally exits from the front glass 3 at the angle $\alpha$. The transmitted ray now strikes the surface of the liquid crystal display 5 at the angle α, where the ray is once more partly reflected (ray R23) and partly refracted. After three refractions and after being attenuated by three partial reflections, the ray strikes the reflector 6.

Different conditions apply in the arrangement according to the invention, as illustrated in the left side of FIG. 2. A light ray E1 likewise striking the surface of the front glass 3 at the angle α is partly refracted and partly reflected (ray R1). The refracted ray passes at an angle β to the perpendicular through the front glass 3, the immersion medium 7, which has virtually the same refractive index and virtually the same dispersion as the material of the front glass 3, through the liquid crystal display 5 and strikes the reflector 6 without further refraction or reflection. The immersion medium 7 causes the light ray R1 to be refracted only once and reflected only once.

The filling of the space between the front glass 3 and the liquid crystal display 5 with an immersion medium 7 has the following additional advantages:
 a. disturbing reflections are considerably reduced,
 b. the slight waviness of the surface of the liquid crystal display element has no disturbing influence upon the ray path; and,
 c. the full contrast of the liquid crystal display is maintained.

Consequently, the displayed information can be read satisfactorily even when observing it at a very acute angle to the plane of the front glass, and also under unfavorable conditions of illumination, e.g. under weak illumination or under light striking the front glass at right angles and dark surroundings.

By applying an anti-reflection coating to the outward facing surface of the front glass 3, in conjunction with filling the space between the front glass 3 and the liquid crystal display 5 with an immersion medium 7, all unwanted reflections of the rays are eliminated.

The described application of immersion media is obviously not restricted to watches with a liquid crystal display; rather, it is to be recommended in all appliances with a liquid crystal display, e.g. measuring instruments and calculators.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A liquid crystal display structure comprising:
 transparent cover plate means,
 liquid crystal display means mounted behind said transparent cover plate means so as to define a cavity between said transparent cover plate means and said liquid crystal display means; and,
 an immersion medium filling said cavity for improving the legibility of said liquid crystal display means.

2. A liquid crystal display structure according to claim 1, wherein:
 said immersion medium is a transparent, colorless silicone oil.

3. A liquid crystal display structure according to claim 1, wherein:
 said immersion medium is a transparent, colorless subsequently curing silicone rubber.

4. A liquid crystal display structure according to claim 3, wherein:
 said silicone rubber is a silicone rubber which remains gel-like after curing.

5. A liquid crystal display structure according to claim 4, wherein:
 said silicone rubber is pre-fabricated into a lenticular element.

6. A liquid crystal display structure according to claim 1, further comprising:
 An anti-reflection coating on the outward facing side of said transparent cover plate means.

* * * * *